United States Patent
Woo et al.

(10) Patent No.: US 7,593,009 B2
(45) Date of Patent: Sep. 22, 2009

(54) APPARATUS AND METHOD FOR RECONSTRUCTING THREE-DIMENSIONAL GRAPHICS DATA

(75) Inventors: Sangoak Woo, Anyang-si (KR); Dokyoon Kim, Seongnam-si (KR); Jeonghwan Ahn, Seoul (KR); Vladimir Sergeevich Belyaev, Saint-Petersburg (RU); Vladislav Germanovich Shubnikov, Saint-Petersburg (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 571 days.

(21) Appl. No.: 11/108,818

(22) Filed: Apr. 19, 2005

(65) Prior Publication Data

US 2005/0234946 A1 Oct. 20, 2005

(30) Foreign Application Priority Data

Apr. 20, 2004 (KR) .................. 10-2004-0027154

(51) Int. Cl.
G06T 15/00 (2006.01)
(52) U.S. Cl. .................. 345/419; 345/423; 345/426; 345/427; 345/428; 345/440; 707/100
(58) Field of Classification Search .................. 345/419, 345/423, 426, 427, 428, 582, 440; 707/98, 707/100
See application file for complete search history.

(56) References Cited

U.S. PATENT DOCUMENTS 6,369,812 B1  4/2002  Iyriboz et al.
6,597,363 B1* 7/2003  Duluk et al. ................. 345/506
2005/0140694 A1* 6/2005  Subramanian et al. ...... 345/619

OTHER PUBLICATIONS

OpenSG Core Team: "OpenSG Starter Guide 1.2.0" [Online] Mar. 19, 2003, pp. 1-65, XP002394586.
Sommer O. et al.: "Geometry and Rendering Optimizations for the Interactive Visualization of Crash-Worthiness Simulations", Proceedings of the Spie—The International Society of Optical Engineering Spie-Int. Soc. Opt. Eng USA, vol. 3960, 2000, pp. 124-134, XP002394741, ISSN: 0277-786X.
Stanker D. et al.: "Occlusion Culling in OpenSG PLUS", Computers and Graphics, Pergamon Press Ltd. Oxford, GB, vol. 28, No. 1, Feb. 2004, pp. 87-92, XP004484897, ISSN: 0097-8493.
Search Report issued by the European Patent Office on Oct. 18, 2006.
OpenSG Starter Guide, Generated by Doxygen 1.3-rc2, Wed Mar 19 06:18:02 2003, 12 pages.
Chinese Office Action for corresponding Chinese Patent Application No.:2005100551236 dated Sep. 5, 2008, 5 pages.

* cited by examiner

*Primary Examiner*—Kimbinh T Nguyen
(74) *Attorney, Agent, or Firm*—Staas & Halsey LLP

(57) ABSTRACT

An apparatus and method for reconstructing 3D graphics data is provided. The apparatus includes a parsing unit to parse 3D graphics data, an aligning unit to align objects of a scene graph having nodes storing geometric information and material information that corresponds to the geometric information included in the 3D graphics data parsed by the parsing unit and hierarchy information regarding the nodes, using predetermined detail information of the material information as a reference, and a rendering unit to interpret the objects of the scene graph aligned by the aligning unit to convert the 3D graphics data into 2D graphics data. Therefore, the present invention can omit the operation of repeatedly storing the same material information by classifying each node of the scene graph according to the material information.

29 Claims, 13 Drawing Sheets

APPARATUS AND METHOD FOR RECONSTRUCTING THREE-DIMENSIONAL GRAPHICS DATA

CROSS-REFERENCE TO RELATED APPLICATION

This application claims the benefit of Korean Patent Application No. 10-2004-0027154, filed on Apr. 20, 2004, in the Korean Intellectual Property Office, the disclosure of which is incorporated herein in its entirety by reference.

BACKGROUND OF THE INVENTION

1. Field of the Invention

The present invention relates to an apparatus for rendering 3D (three-dimensional) graphics data and more particularly to an apparatus and method for reconstructing 3D graphics data.

2. Description of the Related Art

A VRML (Virtual Reality Modeling Language), MPEG (Moving Picture Expert Group) standards, and a file format defined by a general commercial program (e.g., 3D Studio Max, Maya, etc.) are used by an apparatus for rendering 3D graphics data on a screen. 3D data includes: geometric information (e.g., information about positions of 3D points constituting an object and connection information thereof) of an object positioned in 3D space; material information of an object (e.g., information about texture, transparency of an object, color of an object, and shininess of an object's surface); and information about change of such information depending on position, characteristics of a light source, and time. Such 3D graphics data is expressed with a structure intuitively or logically understandable so that a user may easily generate and modify the graphics data. An object in which 3D graphics data is expressed with a structure intuitively understandable in this manner is called a scene graph.

FIG. 1 is a diagram illustrating an example of a node structure of a scene graph. As shown in FIG. 1, the scene graph stores 3D graphic data in a plurality of nodes (group nodes and shape nodes). The group nodes have information about sub-nodes and the shape nodes are leaf nodes and store geometric information and/or material information of an object. In particular, the scene graph includes: nodes that include geometric information and/or material information of an object and connection information that forms a hierarchy by connecting the nodes. Also, some information including position information and rotational information of the node influences position of the sub-nodes. The strong point of such a structure is that its subordinate relationship is easy for a person to understand intuitively according to the relative positions of the nodes.

FIG. 2 is a scene graph of a 3D human body structure. As shown in FIG. 2, suppose that a body of a "person" is expressed in the 3D space. With an abstract node "person" used as a starting node, a "person" is roughly divided into "chest" and "stomach" parts, and the "chest" and the "stomach" are sub-nodes of the node "person". Also, sub-nodes of the "chest" include a "head," a "right arm" and a "left arm," and sub-nodes of the "stomach" include a "left leg" and a "right leg". Information in a high ranking node has a direct influence on a sub-node. Therefore, if position information of the node "person" is changed, such position change information directly influences each of the sub-nodes. Thus, to change the whole body information of a "person" generated in the 3D space, only the relevant information in the node "person" needs to be changed. Such a structure is very convenient and intuitive from the viewpoint of a user who generates and modifies 3D data, because, as described above, only information of the node "person", the highest ranking node, needs to be modified when moving the entire body, not the position information of each part of the body. Also, when changing part of the body information, only the information of the relevant node needs to be changed, without changing information in the sub-nodes.

To read in such 3D graphics data and output the same to a screen, an apparatus for analyzing the meaning of the read 3D graphics data and performing data conversion, is required. Generally, such an apparatus is called a 3D graphics rendering engine. The 3D graphics rendering engine includes a parser and a renderer.

The parser reads in and interprets 3D graphics data. Namely, the parser identifies whether the read data is geometric information of an object, material information of an object, or information about a subordinate relationship between objects originated from the scene graph structure, and interpreting and judging the information.

The renderer changes the scene graph parsed by the parser into a form appropriate for display on a screen of an output device. Since a screen is appropriate for displaying 2D information, the 3D scene graph cannot be directly used. A primary role of the renderer is to convert 3D graphics data into 2D graphics data by performing a coordinate transformation on an object expressed in 3D space. Therefore, output data from the renderer is converted into 2D graphics data.

However, a problem with such a conventional 3D graphics rendering engine lies in producing a 2D output image by performing a 2D data conversion process only on 3D graphics data without changing a 3D graphics data structure. The scene graph, which is a method for expressing a data structure of the 3D graphic data, is an easy structure that can be easily understood and modified intuitively by a user as described above, but storage space is wasted, generation of an output image is delayed, and image quality of the output image is deteriorated. As shown in FIG. 2, there exist nodes that include the same kinds of material information and such nodes are arranged in a discontinuous and irregular order. The renderer converts 3D graphics data of each node into 2D data without changing the scene graph's structure.

FIG. 3 is a diagram illustrating an order of data conversion of the scene graph shown in FIG. 2. Referring to FIG. 3, even if the same kind of material information appears repeatedly, the renderer cannot be aware of such information during the rendering process. Therefore, the renderer repeatedly stores all material information appearing according to a predetermined order in a data storage space on a terminal. Therefore, when using the conventional 3D graphics rendering engine, waste of storage space occurs.

Also, when material information changes between two neighboring nodes during the rendering process, the renderer throws away the original material information and reads the new material information into the storage space of the terminal. Generally, since the process of reading and/or writing data from and to the storage space requires more time compared to other processes such as mathematical computation, such information change causes a large delay in the whole process of converting 3D information into 2D information. Since the conventional 3D graphics rendering engine always reads material information due to a discontinuous arrangement of the same material information, the generation of an output image is delayed.

Also, information representing transparency of an object may be included in the information held by the 3D graphics data. When the nodes having this information are arranged in a discontinuous and irregular order, exact conversion of 3D information into 2D information cannot be guaranteed. When 3D objects having a transparent property are positioned in an overlapping manner, conversion of 3D information into 2D information should be performed by reflecting characteristics such as transparency and the distance of other 3D objects existing in the viewing frustum. However, since the conventional 3D graphics rendering engine does not reflect transparency and distance between 3D objects that belong to each node when determining a rendering order, deterioration in image quality of an output image occurs.

SUMMARY OF THE INVENTION

An aspect of the present invention provides an apparatus and method for reconstructing 3D graphic data capable of grouping nodes of a scene graph according to material information such as transparency information and texture information.

Additional aspects and/or advantages of the invention will be set forth in part in the description which follows and, in part, will be apparent from the description, or may be learned by practice of the invention.

According to an aspect of the present invention, there is provided an apparatus for reconstructing 3D graphics data including: a parsing unit to parse 3D graphics data; an aligning unit to align nodes storing geometric information and material information that corresponds to the geometric information included in the 3D graphics data parsed by the parsing unit, and objects of a scene graph having hierarchy information regarding the nodes using predetermined detail information included in the material information as a reference; and a rendering unit to interpret the objects of the scene graph aligned by the aligning unit to convert the 3D graphics data into 2D graphics data.

According to another aspect of the present invention, there is provided a method of reconstructing 3D graphics data including: parsing 3D graphics data; aligning nodes storing geometric information and material information that corresponds to the geometric information included in the 3D graphics data, and objects of a scene graph having hierarchy information regarding the nodes using predetermined detail information included in the material information as a reference; and interpreting the aligned objects of the scene graph to convert the 3D graphics data into a 2D graphics data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
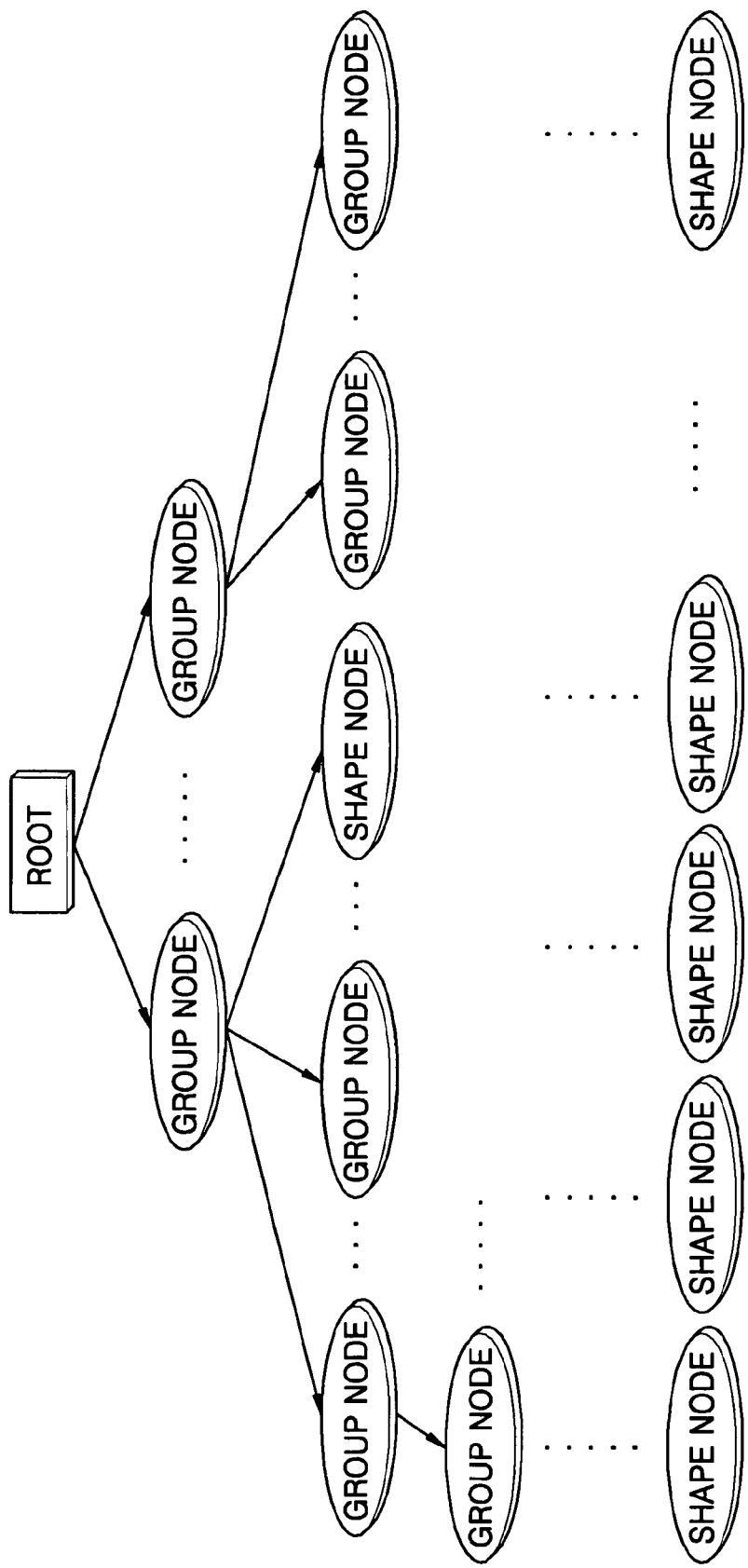
FIG. 1 is a diagram illustrating an example of a node structure of a scene graph.
Figure 2:
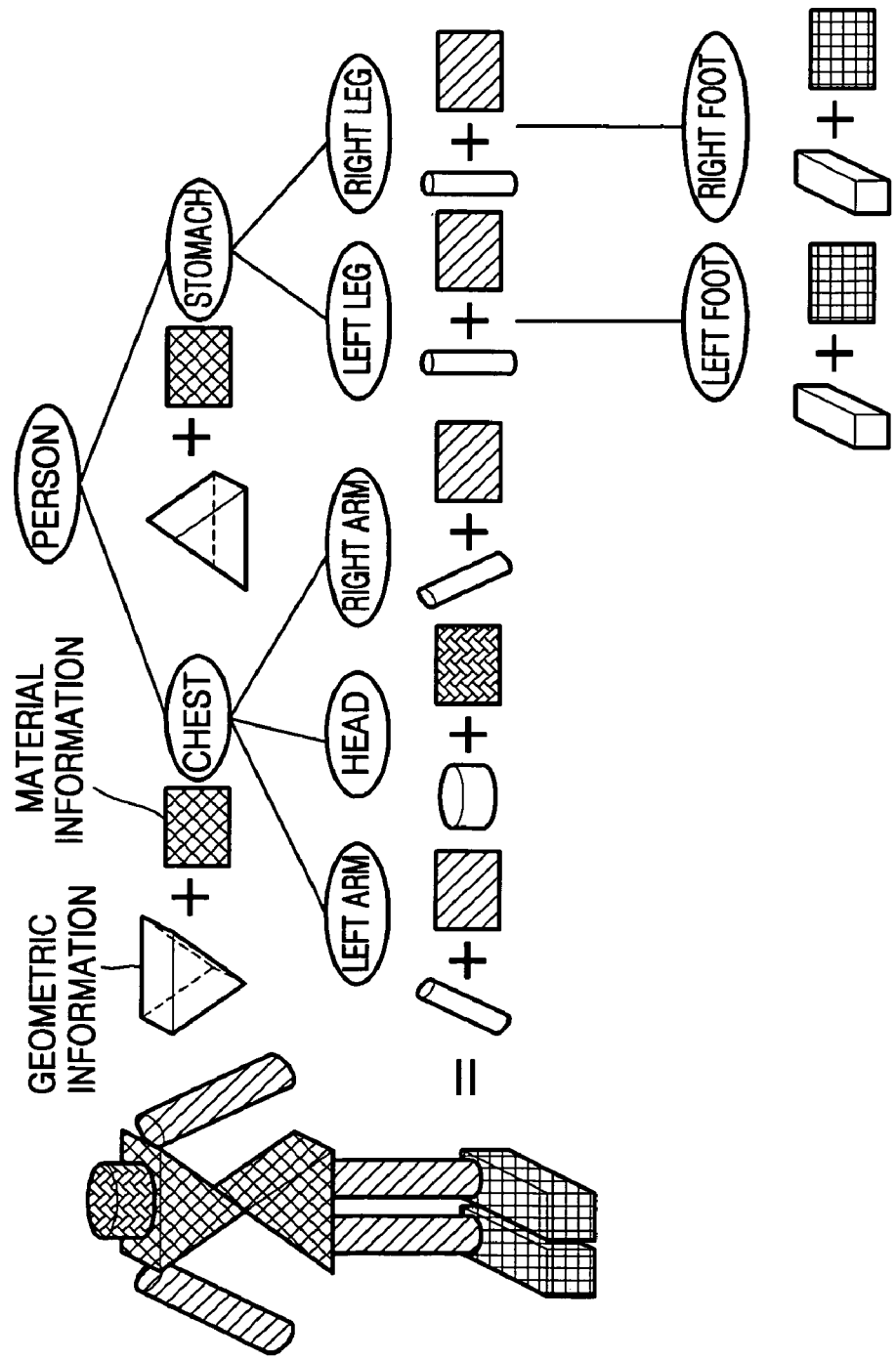
FIG. 2 is a scene graph illustrating a 3D body structure.
Figure 3:
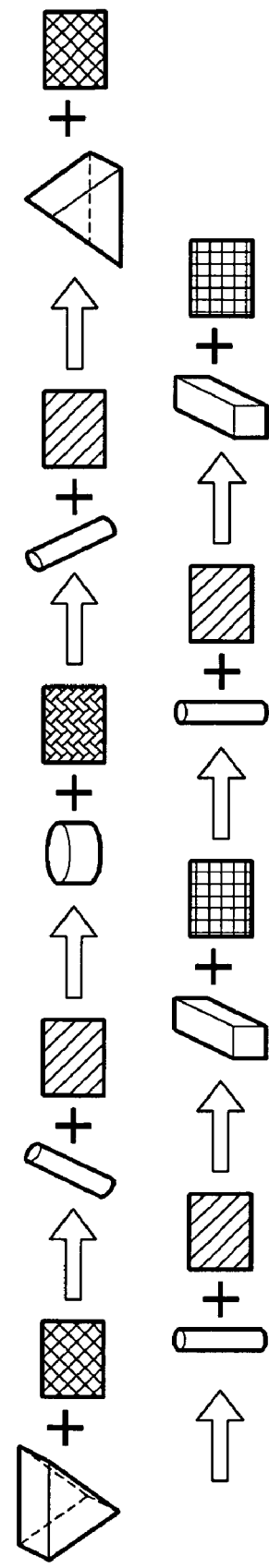
FIG. 3 is a diagram illustrating an order of data conversion of the scene graph shown in FIG. 2, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 4:
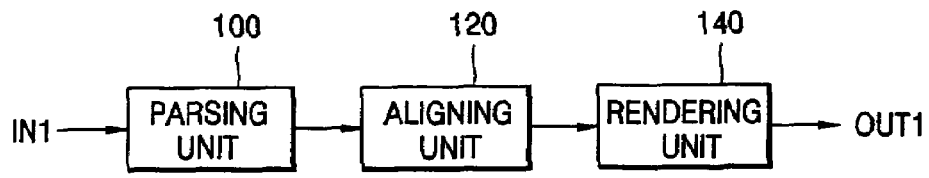
FIG. 4 is a block diagram of an apparatus for reconstructing 3D graphics data according to an embodiment of the present invention.

FIG. 4 is a block diagram of an apparatus for reconstructing 3D graphics data according to an embodiment of the present invention. The apparatus for reconstructing 3D graphics data includes a parsing unit 100, an aligning unit 120, and a rendering unit 140.

The parsing unit 100 reads in and parses 3D graphics data such as VRML (Virtual Reality Modeling Language) data, or MPEG (Moving Picture Expert Group) data. The parsing unit 100 parses the scene graph of the 3D graphics data which is input through an input terminal IN1, and outputs information regarding the parsed scene graphs, to the aligning unit 120. The scene graph has nodes that include geographic information and material information that corresponds to the geographic information, and also has hierarchy information of the nodes. Assume that detail information regarding geometric information and material information of the scene graphs, is an object of the scene graph. The geometric information is said to be 3D information representing the appearance of an object. The material information includes detail information. The detail information represents texture, transparency of an object, color of an object and shininess of an object's surface. Since the specific functions of the parsing unit 100 are similar to the conventional art, a description thereof will be omitted.

The aligning unit 120 aligns objects of the scene graph parsed by the parsing unit 100 using as a reference predetermined detail information included in the material information, and outputs the objects of the aligned scene graph to the rendering unit 140. In one embodiment, aligning is performed on the transparency information and the texture information included in the predetermined detail information. The transparency information is divided into transparent geometric information and opaque geometric information depending on transparency. Transparent geometric information and opaque geometric information are separated and individually stored. The opaque geometric information is aligned according to texture information and the transparent geometric information is aligned in consideration of a distance between a camera and a position of the transparent geometric information.

Figure 5:
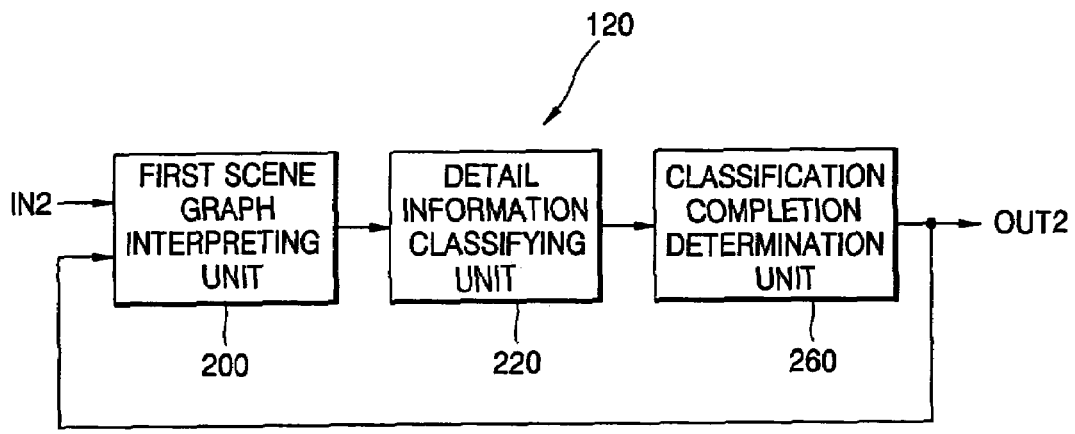
FIG. 5 is a block diagram of an aligning unit shown in FIG. 4, according to an embodiment of the present invention.

FIG. 5 is a block diagram of the aligning unit 120 shown in FIG. 4, according to an embodiment of the present invention. The aligning unit includes a first scene graph interpreting unit 200, a detail information classifying unit 220, and a classification completion determination unit 260.

The first scene graph interpreting unit 200 receives objects of the scene graph parsed by the parsing unit 100 via an input terminal IN2, and interprets the objects of the input scene graph and outputs the same to the detail information classifying unit 220.

Figure 6:
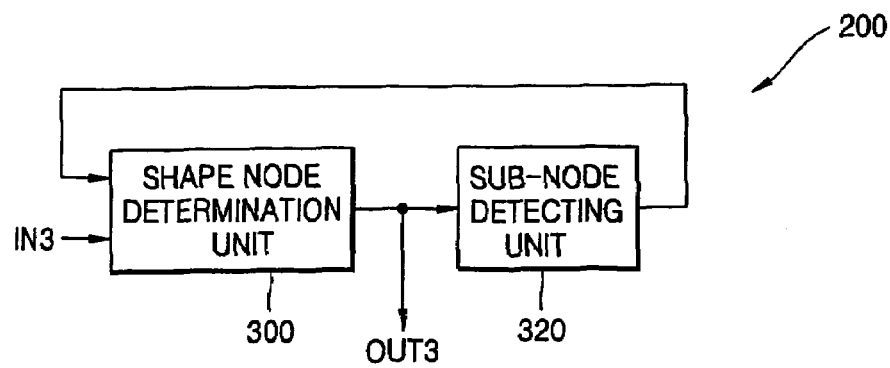
FIG. 6 is a block diagram of a first scene graph interpreting unit shown in FIG. 5, according to an embodiment of the present invention.

FIG. 6 is a block diagram of the first scene graph interpreting unit 200 shown in FIG. 5, according to an embodiment of the present invention. The first scene graph interpreting unit 200 includes a shape node determination unit 300 and a sub-node detecting unit 320.

When the scene graph is received via an input terminal IN3, the shape node determination unit 300 determines whether a node is a shape node of the scene graph, and outputs the determination results to the sub-node detecting unit 320 or to the detail information classifying unit 220 via an output terminal OUT3. A shape node is a node storing the geometric information and material information that corresponds to the geometric information. Since the shape node is a leaf node, the shape node does not have sub-nodes. If the node inspected by the shape node determination unit 300 is not a shape node, the inspected node is a group node having sub-nodes. If the inspected node is a shape node, the shape node determination unit 300 outputs the determination results to the detail information classifying unit 220 via the output terminal OUT3. However, if the inspected node is not a shape node, the shape node determination unit 300 outputs the determination results to the sub-node detecting unit 320.

The sub-node detecting unit 320 detects sub-nodes connected to a sub-hierarchy of the inspected node. If the determination results indicate that the inspected node has sub-nodes, the sub-node detecting unit 320 detects the sub-nodes in the sub-hierarchy of the inspected node, and outputs the detected results to the shape node determination unit 300.

When the result of detection is received from the sub-node detecting unit 320, the shape node determination unit 300 determines whether the detected sub-nodes are shape nodes.

When objects of the interpreted scene graph are received from the first scene graph interpreting unit 200, the detail information classifying unit 220 classifies and stores the interpreted objects using predetermined detail information as a reference, and outputs the stored results to the classification completion determination unit 260.

Figure 7:
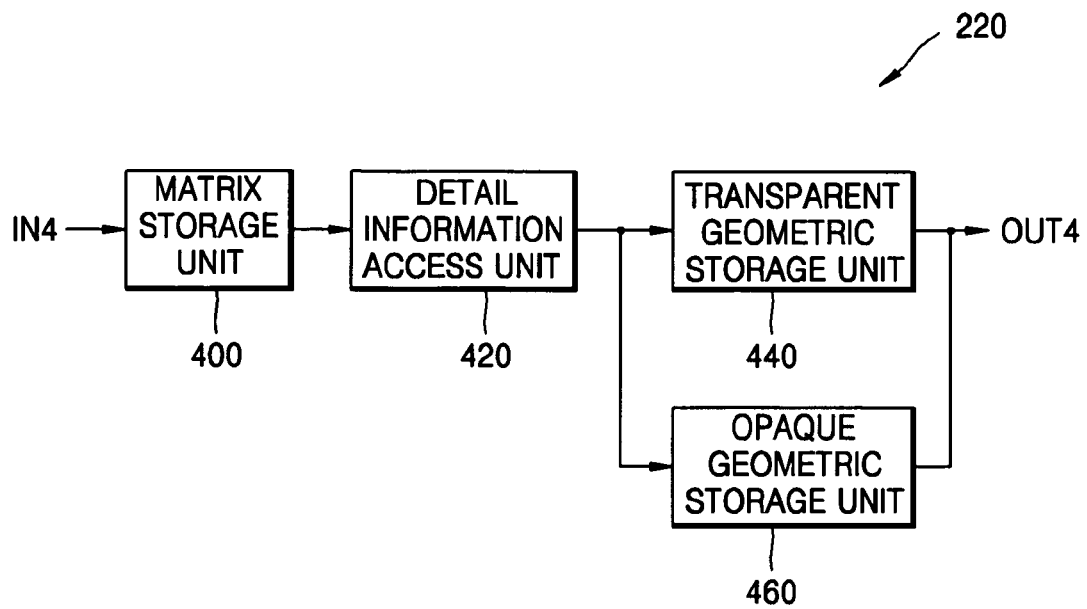
FIG. 7 is a block diagram of a detail information classifying unit shown in FIG. 5, according to an embodiment of the present invention.

FIG. 7 is a block diagram of the detail information classifying unit 220 shown in FIG. 5, according to an embodiment of the present invention. The detail information classifying unit 220 includes a matrix storage unit 400, a detail information access unit 420, a transparent geometric storage unit 440, and an opaque geometric storage unit 460.

The matrix storage unit 400 determines which hierarchy of the scene graph the read shape node belongs to, computes a GTM (Global Transformation Matrix) capable of performing conversion from local coordinates of the relevant hierarchy to global coordinates, stores the results in the read shape node, and outputs the read shape node to the detail information access unit 420.

The detail information access unit 420 reads predetermined detail information of the material information of the shape node. The detail information access unit 420 reads predetermined detail information of the material information of the interpreted shape node and outputs the same to the transparent geometric storage unit 440 or the opaque geometric storage unit 460 according to the predetermined detail information.

In particular, the detail information access unit 420 reads texture information and/or transparency information of the predetermined detail information of the material information of the shape node. If the transparency information is transparent geometric information representing something transparent, the detail information access unit 420 outputs the read shape node to the transparent geometric storage unit 440; and if the transparency information is the opaque geometric information representing something opaque, the detail information access unit 420 outputs the read shape node to the opaque geometric storage unit 460.

The transparent geometric storage unit 440 uses a one-dimensional array storage structure to store the read shape node. After a distance between the read shape node and a camera viewing the transparent geometric information is computed, the shape nodes are stored in the array, in which shape nodes which are distant from the camera are stored first, and shape nodes which are close to the camera are stored later. Such a storing order is intended to prevent image quality deterioration due to corruption of the transparent geometric information.

Figure 8:
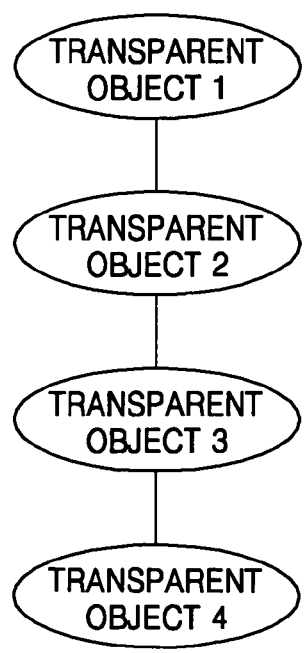
FIG. 8 is a schematic representation of a storage structure of transparent geometric information stored in a transparent geometric storage unit shown in FIG. 7, according to an embodiment of the present invention.

FIG. 8 is a schematic representation of a storage structure of transparent geometric information stored in the transparent geometric storage unit 440 shown in FIG. 7, according to an embodiment of the present invention. As shown in FIG. 8, transparent geometric information of the shape node farthest from the camera is stored in a transparent object 1. Transparent geometric information of a shape node closer to the camera than the shape stored in the transparent object 1, is stored in a transparent object 2. Shape nodes successively closer to the camera are stored in a transparent object 3 and a transparent object 4, respectively.

The opaque geometric storage unit 460 has a ring structure for storing texture information included in the detail information. The ring structure, in which first data and last data are stored in adjacent storage units, denotes a storage structure of a linked list.

The opaque geometric storage unit 460 determines whether texture information included in the detail information of the read shape node is already included in the ring. If the texture information is not included in the ring, the texture information is added to the ring and the opaque geometric information of the shape node is stored in a sub-ring of the texture information. If the texture information is already included in the ring, the texture information is not added to the ring, and the opaque geometric information of the shape node is stored in a sub-ring of the texture information which is already stored in the ring.

Figure 9:
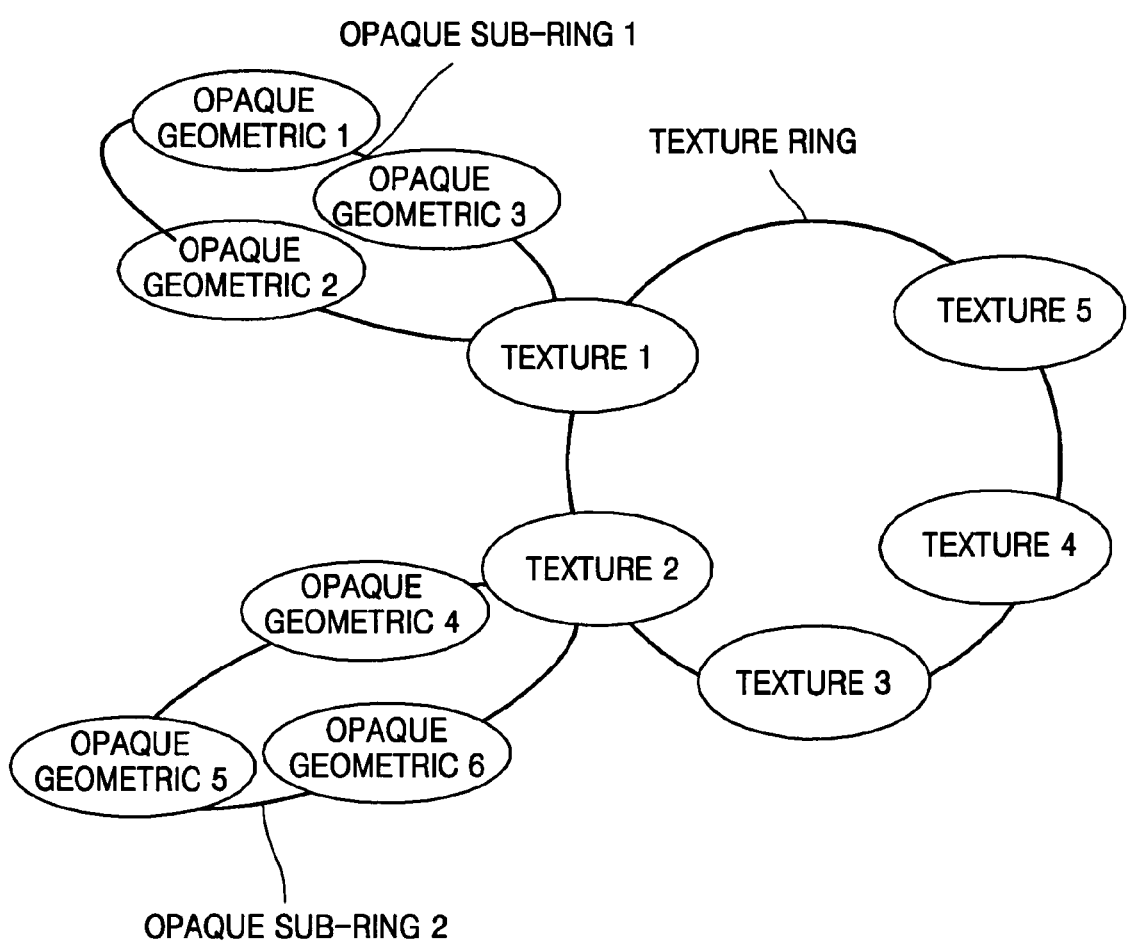
FIG. 9 is a schematic representation of a storage structure of opaque geometric information stored in an opaque geometric storage unit shown in FIG. 7, according to an embodiment of the present invention.

FIG. 9 is a schematic representation of a storage structure of opaque geometric information stored in the opaque geometric storage unit 460 shown in FIG. 7, according to an embodiment of the present invention. FIG. 9 exemplarily shows the texture information included in the detail information. As shown in FIG. 9, the opaque geometric storage unit 460 uses a texture ring to store the texture information (texture 1, 2, 3, 4, and 5). In the texture ring, five pieces of texture information (texture 1, 2, 3, 4, and 5) representing different textures are stored. The texture ring has sub-rings. In the sub-rings, opaque geometric information (opaque geometric 1, 2, 3, 4, 5, and 6) including the texture of the texture information (1, 2, 3, 4, and 5), is stored.

Figure 10:
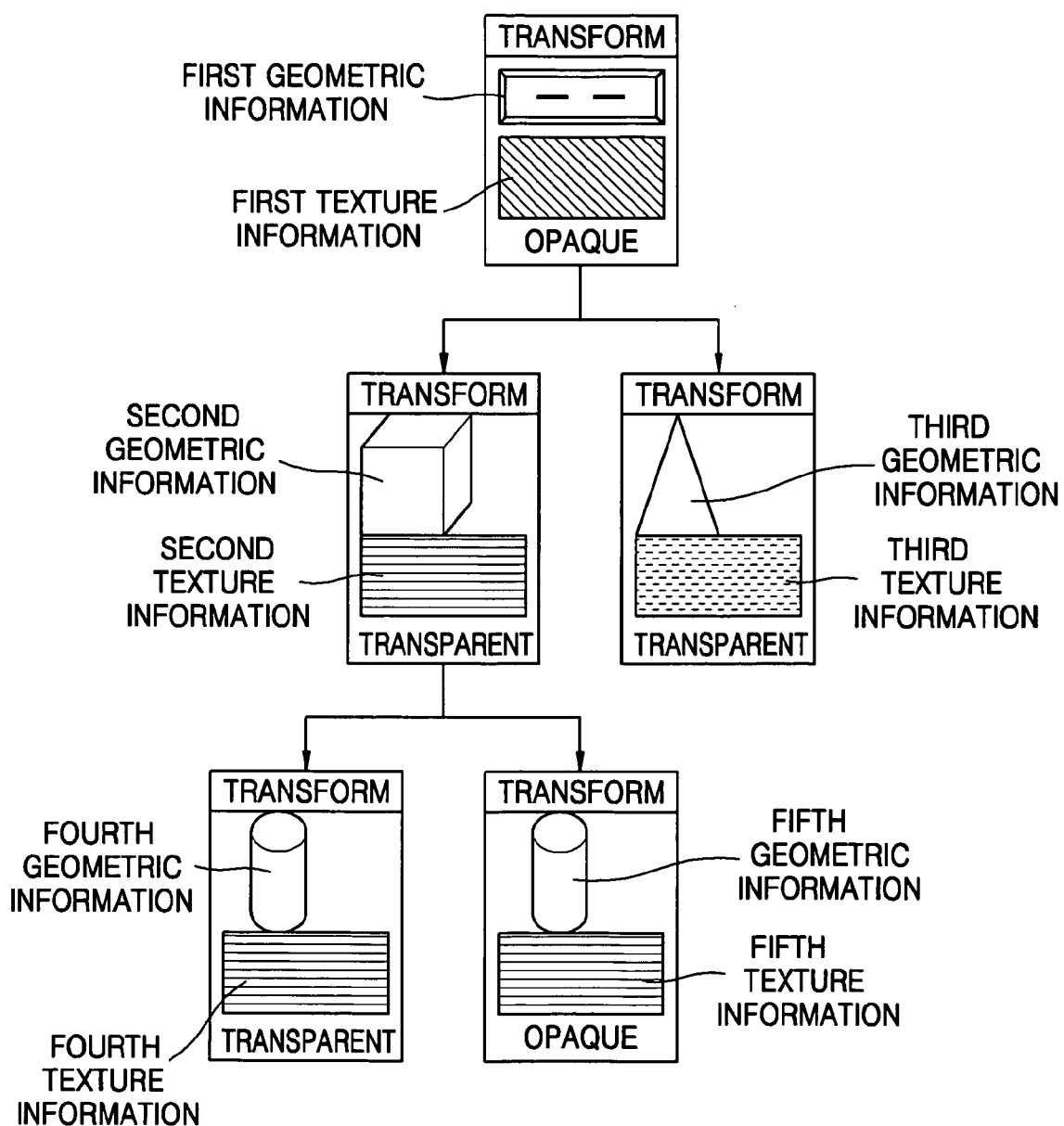
FIG. 10 is a schematic representation of a scene graph, according to an embodiment of the present invention.
Figure 11A:
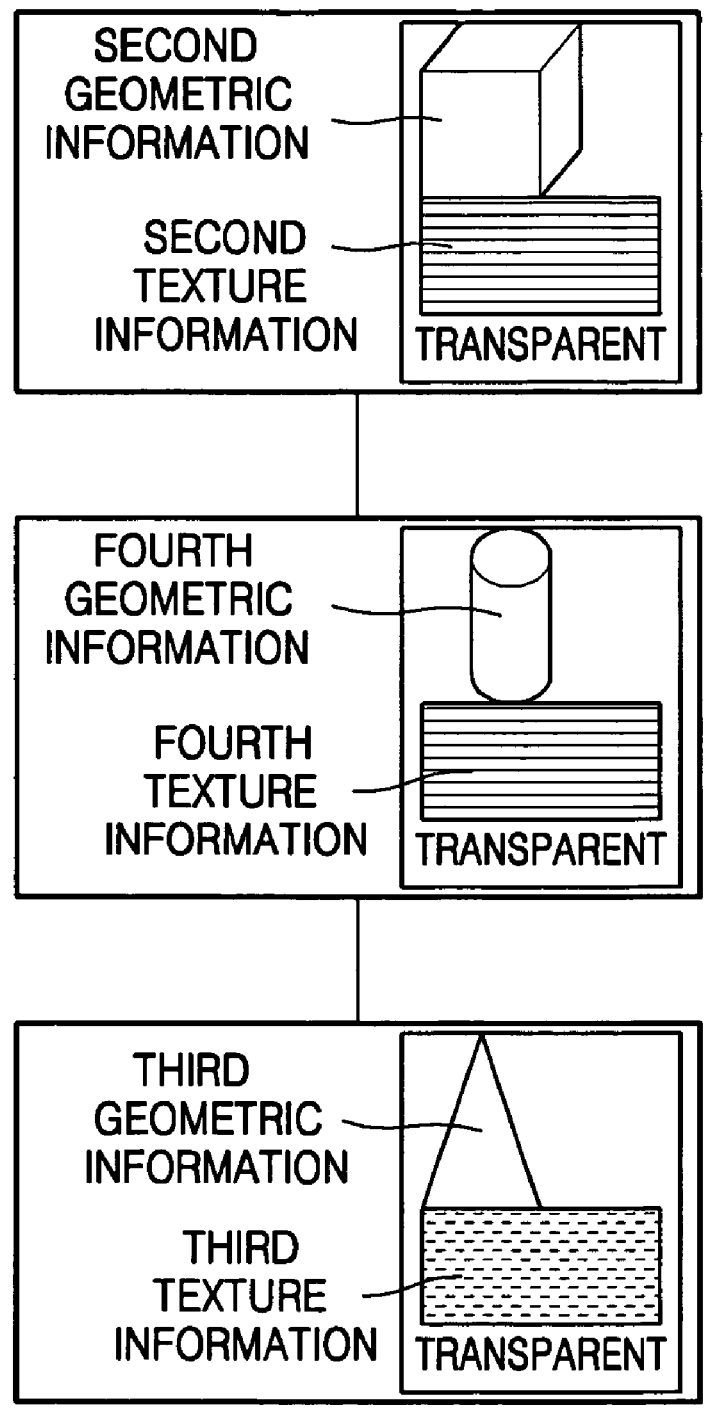
FIGS. 11A and 11B are diagrams illustrating results after aligning the scene graph shown in FIG. 10, according to an embodiment of the present invention.
Figure 11B:
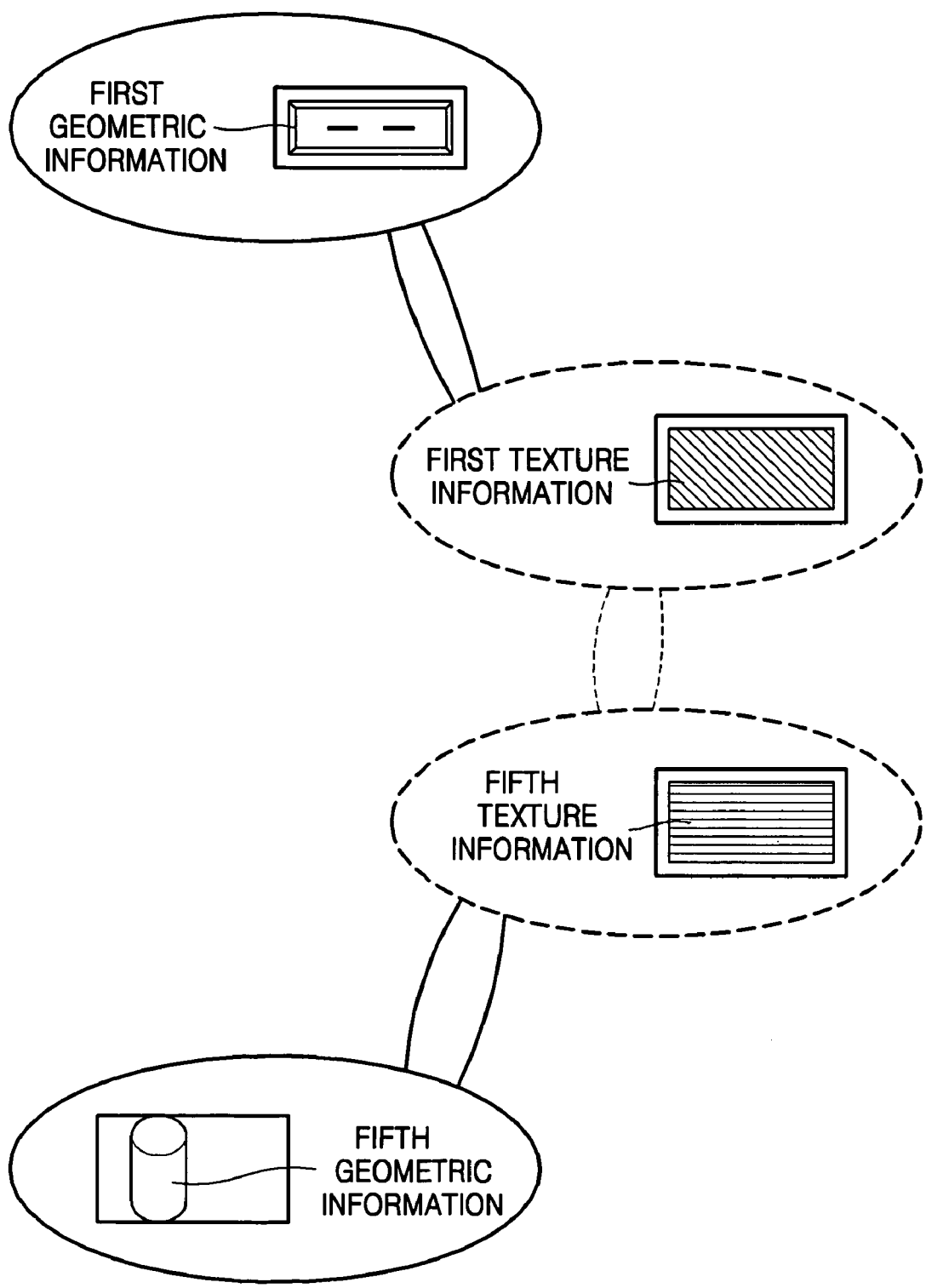

FIG. 10 illustrates how a scene graph is reconstructed according to an embodiment of the present invention, and FIGS. 11A and 11B are diagrams illustrating the results after aligning the objects of the scene graph shown in FIG. 10, according to an embodiment of the present invention.

The scene graph shown in FIG. 10 is reconstructed with use of the aligning unit 120. The following description uses the array structure of the transparent geometric storage unit 440 exemplarily shown in FIG. 8 and the ring structure of the opaque geometric storage unit 460 shown in FIG. 9. The shape nodes of the scene graph are first classified according to the transparency information. If the shape node includes the transparent geometric information which is the transparent information, the shape node is stored in the transparent geometric storage unit 440 as shown in FIG. 11A. At this point, the order in which objects are stored in the transparent geometric storage unit 440 is determined according to the distance between the camera and the object. That is, an object that is farthest from the camera is aligned first. Therefore, referring to FIG. 11A, second, fourth, and third geometric information is stored in the given order in consideration of the distance from the camera.

If the shape node includes opaque geometric information, the texture ring is constructed using the texture information included in the shape nodes and the geometric information that includes the texture information is stored in the sub-rings of the texture information, as shown in FIG. 11B. Therefore, the first and fifth texture information constitute the texture ring, and the first and the fifth geometric information constitute the sub-rings. When the opaque geometric information includes the same texture information repeatedly, each piece of geometric information will be aligned in a sub-ring of a texture, which provides a structure in which large amounts of texture information can be processed in an efficient manner.

The classification completion determination unit 260 determines whether all the objects of the interpreted scene graph are classified, and outputs the determination results via the output terminal OUT2. At this point, if not all nodes of the interpreted scene graph are classified completely with the predetermined detail information used as a reference, the classification completion determination unit 260 outputs the determination results to the first scene graph interpreting unit 200. The first scene graph interpreting unit 200 reinterprets the scene graph in response to the determination results of the classification completion determination unit 260.

As described above, the scene graph is aligned based on each piece of texture information by the aligning unit, and thus the same texture information need not be stored repeatedly.

The rendering unit 140 interprets the objects of the scene graphs aligned by the aligning unit 120 to convert 3D data into 2D graphics data and outputs the converted 2D graphics data via the output terminal OUT1.

Figure 12:
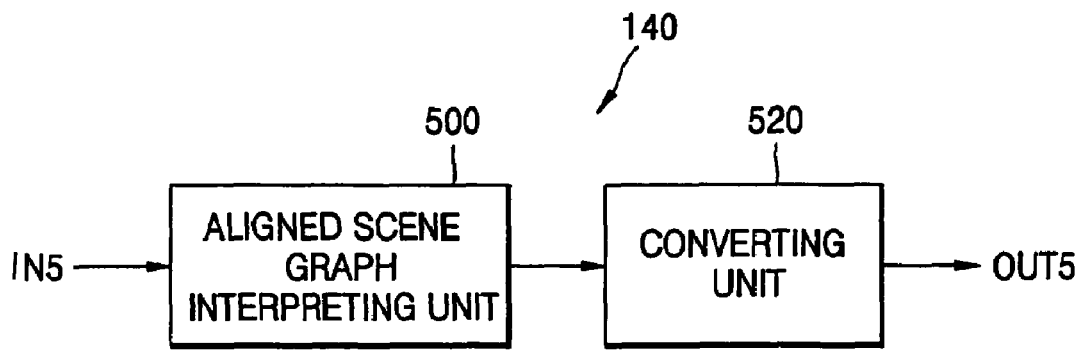
FIG. 12 is a block diagram of a rendering unit shown in FIG. 4, according to an embodiment of the present invention.

FIG. 12 is a block diagram of the rendering unit 140 shown in FIG. 4, according to an embodiment of the present invention. The rendering unit 140 includes an aligned scene graph interpreting unit 500 and a converting unit 520.

The aligned scene graph interpreting unit 500 interprets predetermined detail information received via an input terminal IN5 and the transparent and opaque geometric information that corresponds to the predetermined detail information, and outputs the interpreted results to the converting unit 520.

The aligned scene graph interpreting unit 500 receives the texture information and the opaque geometric information stored in the sub-ring of the received texture information from the aligning unit 120, and interprets the received texture information and the opaque geometric information. Also, the aligned scene graph interpreting unit 500 receives the transparent geometric information from the aligning unit 120 and interprets the received transparent geometric information.

The converting unit 520 converts the predetermined detail information, the transparent geometric information, and the opaque geometric information into 2D graphics data, and outputs the converted results via an output terminal OUT5. In particular, the converting unit 520 converts the 3D graphics data into the 2D graphics data starting with the transparent geometric information farthest from the camera and finished with the transparent geometric information closest to the camera, with respect to the interpreted transparent geometric information.

The rendering unit 140 interprets and converts the opaque geometric information first, and then interprets and converts the transparent geometric information. If rendering is performed on the aligned transparent object after rendering is performed on the aligned opaque object, image quality deterioration that may be generated due to the transparent object can be prevented.

A method for reconstructing the 3D graphics data according to an embodiment of the present invention will now be described with reference to the accompanying drawings.

Figure 13:
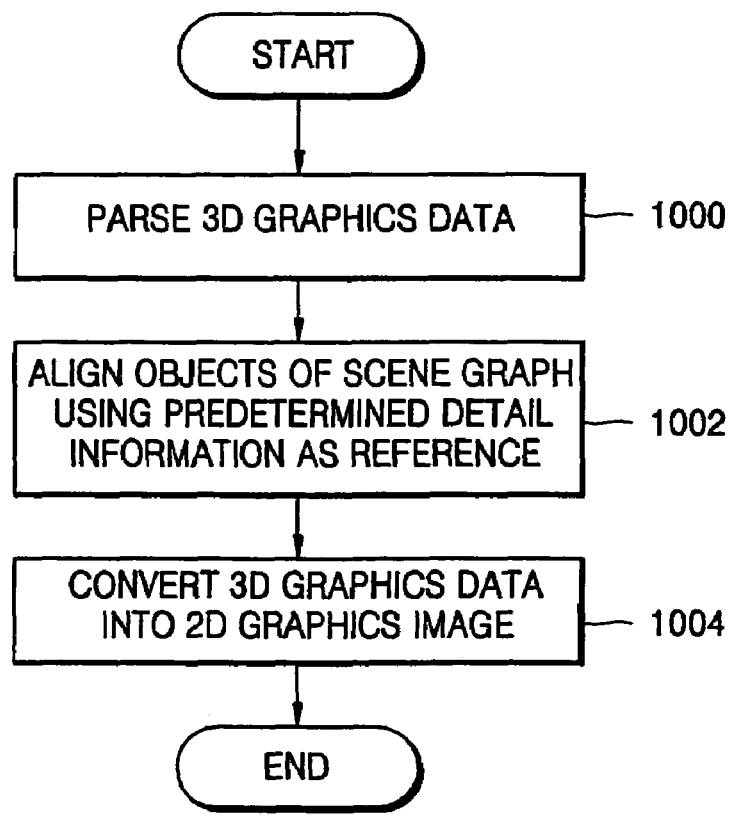
FIG. 13 is a flowchart illustrating a method of reconstructing 3D graphic data according to an embodiment of the present invention.

FIG. 13 is a flowchart illustrating a method of reconstructing 3D graphics data according to an embodiment of the present invention. The method includes aligning objects of a scene graph of 3D graphics data using predetermined detail information as a reference and converting the 3D graphics data into 2D graphics data using the aligned scene graph.

First, the 3D graphics data is parsed (operation 1000). The scene graph among the 3D graphics data is also parsed. The scene graph includes the nodes that include geometric information and material information that corresponds to each piece of the geometric information. The scene graph also includes hierarchy information for the nodes.

Next, the objects of the scene graph of the 3D graphics data are aligned using the predetermined detail information of the material information as a reference (operation 1002). At this point, the aligned predetermined detail information is the transparency information and the texture information.

Figure 14:
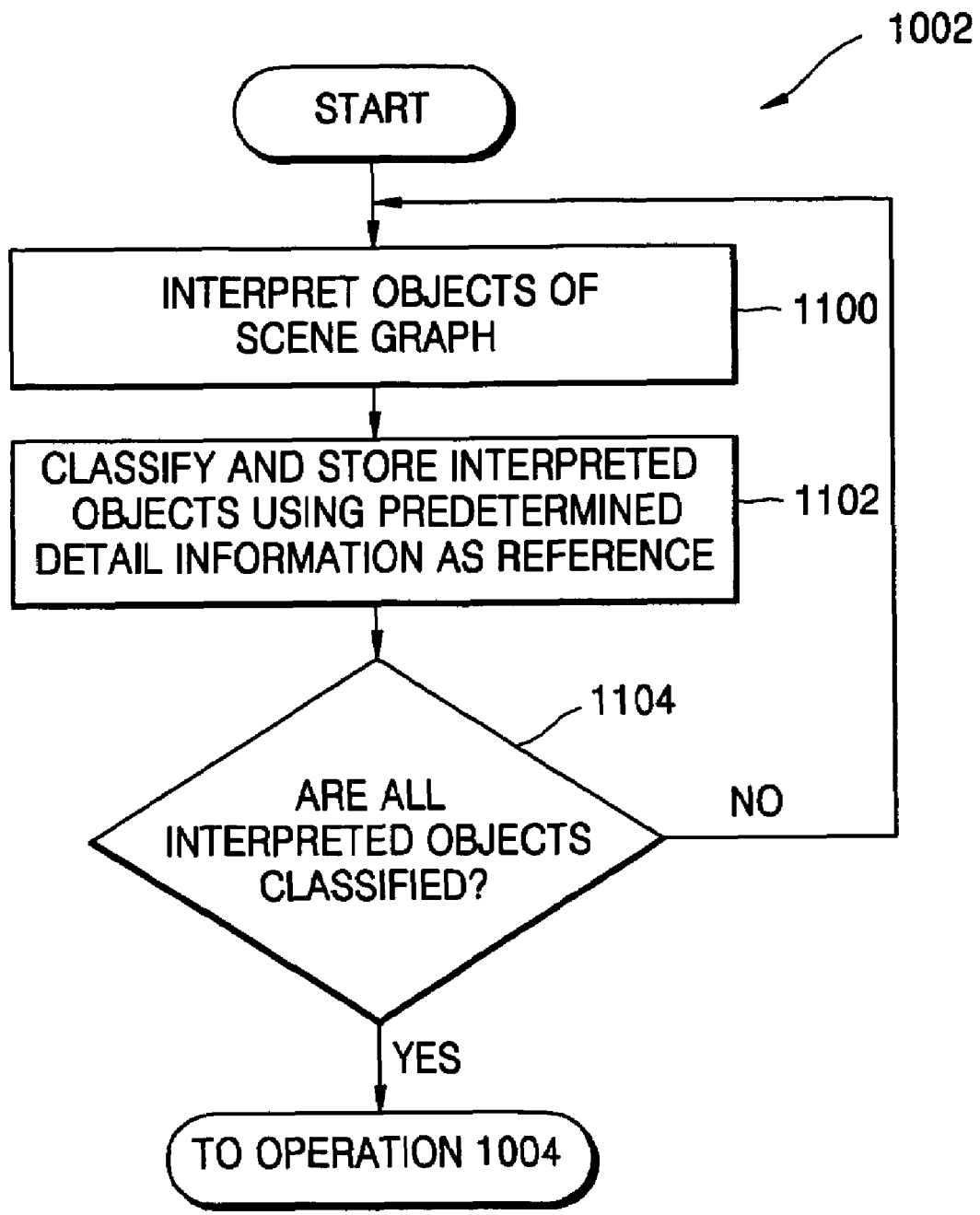
FIG. 14 is a flowchart illustrating an alignment operation shown in FIG. 13, according to an embodiment of the present invention.

FIG. 14 is a flowchart illustrating the alignment operation 1002 shown in FIG. 13, according to an embodiment of the present invention. The operation 1002 includes: classifying the objects of the scene graph using the predetermined detail information as a reference, and determining whether such objects are all classified.

First, the objects of the scene graph are interpreted (operation 1100).

Figure 15:
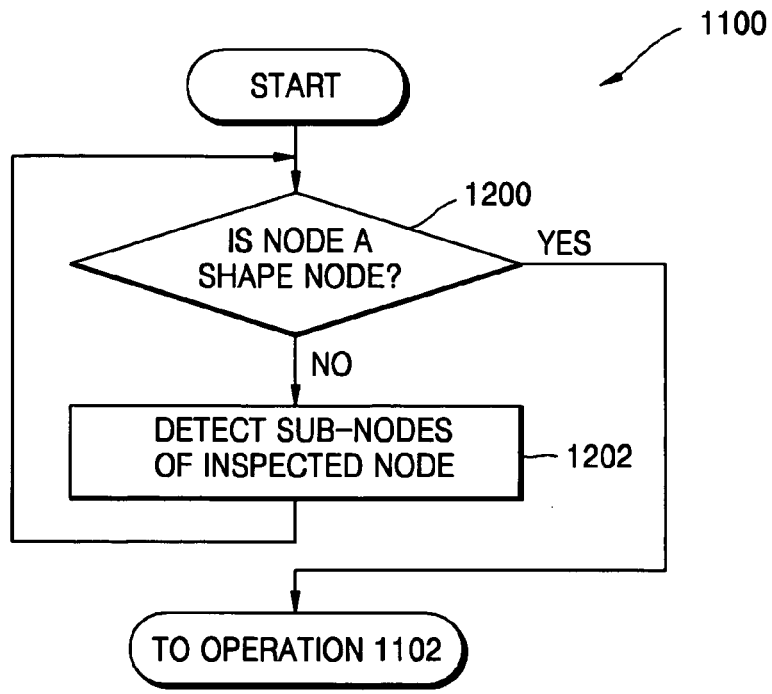
FIG. 15 is a flowchart illustrating an interpretation operation shown in FIG. 14, according to an embodiment of the present invention.

FIG. 15 is a flowchart illustrating the interpretation operation 1100 shown in FIG. 14, according to an embodiment of the present invention. The operation 1100 includes operations 1200 and 1202 of detecting sub-nodes of each of the nodes depending on whether the inspected node is a shape node or not.

First, it is determined whether one of the nodes is a shape node having the geometric and material information (operation 1200).

If the inspected node is not a shape node, the sub-nodes connected to the inspected node are detected and the operation 1200 (operation 1202) is performed.

However, if the inspected node is a shape node, the operation 1102 is performed.

After the operation 1100, the objects of the interpreted scene graph are classified and stored using the predetermined detail information as a reference (operation 1102).

Figure 16:
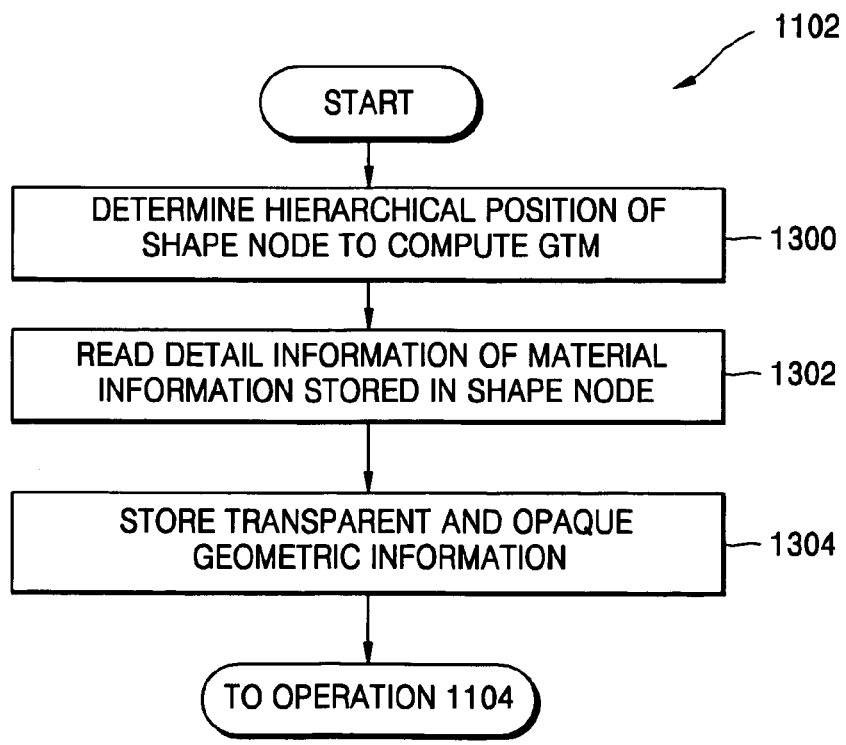
FIG. 16 is a flowchart illustrating a classification and storage operation shown in FIG. 14, according to an embodiment of the present invention.

FIG. 16 is a flowchart illustrating the classification and storage operation 1102 shown in FIG. 14, according to an embodiment of the present invention. The operation 1102 includes: reading the predetermined detail information of the material information and storing the transparent and opaque geometric information.

First, a hierarchical position of the shape node is determined and a GTM is computed (operation 1300).

Then, the predetermined detail information of the material information stored in the shape node is read (operation 1302).

Subsequently, the transparent and opaque geometric information included in the material information of the shape node are stored (operation 1304). At this point, if the material information is opaque geometric information, the opaque geometric information is stored in the sub-ring structure of the texture information; and if the material information is transparent geometric information, the transparent geometric information is stored in the array structure. That is, depending on the opaque geometric information included in the material information stored in the shape node, the material information is divided into transparent object lists and opaque object lists, and the transparent object lists are aligned according to a distance between the transparent object and a camera viewing the transparent object. One ring is constructed by the textures used for the opaque object list, and a sub-ring is constructed for each object that includes the same texture information and stored.

Then, it is determined whether the objects of the scene graph are all classified (operation 1104).

If the objects of the scene graph are all classified, the operation 1004 is performed. However, if the objects of the scene graph are not all classified, the operations 1100 through 1104 are performed.

Next, the aligned scene graph is interpreted and the 3D graphics data is converted into the 2D graphics data (operation 1004). At this point, after the opaque geometric information included in the material information is interpreted and converted, the transparent geometric information is interpreted and converted.

Figure 17:
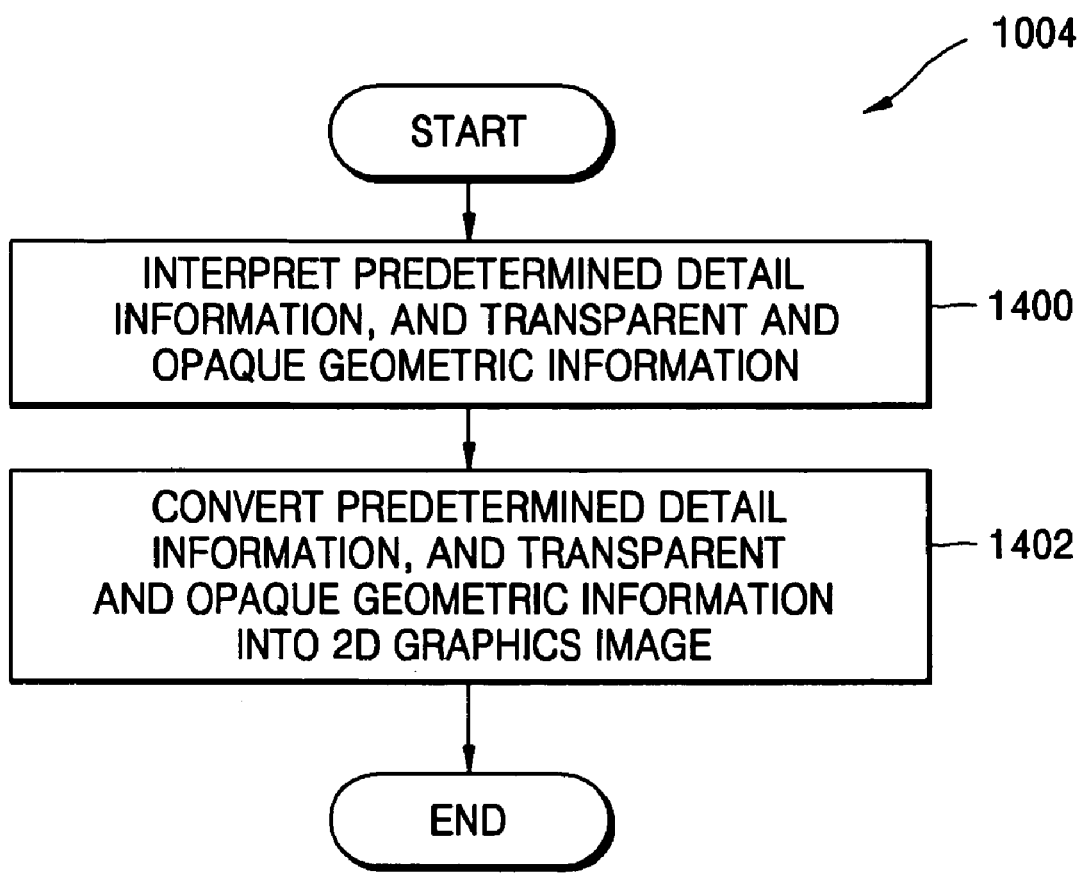
FIG. 17 is a flowchart illustrating a conversion operation shown in FIG. 13, according to an embodiment of the present invention.

FIG. 17 is a flowchart illustrating the conversion operation 1004 shown in FIG. 13, according to an embodiment of the present invention.

First, the predetermined detail information, and the transparent and opaque geometric information that correspond to the predetermined detail information are interpreted (operation 1400).

Then, the predetermined detail information, the transparent geometric information and the opaque geometric information are converted into the 2D graphics data (operation 1402). At this point, the 3D graphics data is converted into the 2D graphics data based on the order in which the transparent geometric information is aligned in operation 1304.

Unlike conventional methods, in the present invention, 3D graphics data is classified according to its characteristics and the 3D graphics data is reconstructed according to the characteristics, whereby a fast and a more precise conversion of the 3D graphics data into a 2D graphics data is guaranteed and efficient management of the 3D graphics data is enhanced. Such characteristics of the present invention can be applied to a PC (personal computer) used in a fixed place, a mobile device such as a PDA (Personal Digital Assistant) or a cellular phone.

As described above, an apparatus and method for reconstructing 3D graphics data according to the present invention can omit operations of repeatedly storing the same texture information by using an aligning unit to classify each node of a scene graph into groups according to texture information.

Also, according to the present invention, since an operation of converting the 3D graphics data into the 2D data, can be performed for each group of the texture information, time loss in the data conversion due to change of the texture information during the conversion process can be minimized.

Also, the present invention classifies the geometric information by using the transparent information to sequentially perform data conversion according to the distance, from a viewing point, thereby converting the 3D graphics data into the 2D data in a more precise manner.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for reconstructing three-dimensional (3D) graphics data comprising:
   a parsing unit to parse 3D graphics data;
   an aligning unit to align objects of a scene graph having nodes storing geometric information and material information that corresponds to the geometric information included in the 3D graphics data parsed by the parsing unit and hierarchy information regarding the nodes, wherein the aligning includes placing the objects of the scene graph in an order using predetermined detail information included in the material information as a reference; and
   a rendering unit to interpret the objects of the scene graph in the order determined by the aligning unit and to convert the 3D graphics data into a two-dimensional (2D) image comprising 2D graphics data.

2. The apparatus of claim 1, wherein the predetermined detail information includes at least one of transparency information and texture information.

3. The apparatus of claim 2, wherein the aligning unit comprises:
   a first scene graph interpreting unit to interpret the objects of the scene graph input from the parsing unit;
   a detail information classifying unit to classify and store the interpreted objects using the predetermined detail information as a reference; and
   a classification completion determination unit to determine whether all of the objects are classified.

4. The apparatus of claim 3, wherein the first scene graph interpreting unit comprises:
   a shape node determination unit to determine whether each of the nodes is a shape node storing the geometric information and the material information with respect to either of the nodes; and a sub-node detecting unit to detect sub-nodes connected to the inspected node.

5. The apparatus of claim 4, wherein the detail information classifying unit comprises:
a matrix storage unit to determine a hierarchical position of each of the shape nodes to compute a global transformation matrix (GTM), and to store the computed GTM if the node is determined to be a shape node as a result of the determination by the shape node determination unit;
a detail information access unit to read the predetermined detail information included in the material information stored in the shape node;
a transparent geometric storage unit to store transparent geometric information included in the transparency information that corresponds to the predetermined detail information read by the detail information access unit; and
an opaque geometric storage unit to store opaque geometric information included in the transparency information that corresponds to the predetermined detail information read by the detail information access unit.

6. The apparatus of claim 5, wherein the transparent geometric storage unit stores the transparent geometric information in a one-dimensional array according to decreasing distance between a camera viewing the transparent geometric information and the transparent geometric information.

7. The apparatus of claim 5, wherein the opaque geometric storage unit stores the texture information included in the opaque geometric information in a texture ring, and stores the opaque geometric information in a sub-geometric ring.

8. The apparatus of claim 2, wherein the rendering unit includes:
an aligned scene graph interpreting unit to interpret the predetermined detail information and transparent and opaque geometric information that correspond to the predetermined detail information; and
a converting unit to convert the predetermined detail information, the transparent geometric information and the opaque geometric information into the 2D graphics data.

9. The apparatus of claim 8, wherein the rendering unit interprets the opaque geometric information and converts the opaque geometric information into the 2D graphics data first, and then interprets the transparent geometric information and converts the transparent geometric information into the 2D graphics data.

10. The apparatus of claim 9, wherein the converting unit converts the 3D graphics data into the 2D graphics data according to decreasing distance between a camera viewing the transparent geometric information and the transparent geometric information.

11. A method of reconstructing three-dimensional (3D) graphics data performed by a rendering apparatus, the method comprising:
parsing 3D graphics data;
aligning objects of a scene graph having nodes storing geometric information and material information that corresponds to the geometric information included in the 3D graphics data, and hierarchy information regarding the nodes, wherein the aligning includes placing the objects of the scene graph in an order using predetermined detail information included in the material information as a reference;
interpreting the objects of the scene graph, received by the rendering apparatus, in the order determined by the aligning unit to convert the 3D graphics data into 2D graphics data; and
outputting the 2D graphics data.

12. The method of claim 11, wherein the predetermined detail information includes at least one of transparency information and texture information.

13. The method of claim 12, wherein the operation of aligning objects of the scene graph comprises:
interpreting the objects of the scene graph;
classifying and storing the interpreted objects using the predetermined detail information as a reference; and
determining whether all of the objects are classified.

14. The method of claim 13, wherein the operation of interpreting the objects of the scene graph comprises:
determining whether each of the nodes is a shape node storing the geometric and material information with respect to either of the nodes; and
if the inspected node is not a shape node, detecting sub-nodes connected to a sub-hierarchy of the inspected node and determining whether the sub-nodes are shape nodes.

15. The method of claim 14, wherein the operations of classifying and/or interpreting the objects comprises:
determining a hierarchical position of the shape node to compute a global transformation matrix (GTM);
reading the predetermined detail information included in the material information stored in the shape node; and
storing transparent and opaque geometric information included in the transparency information that corresponds to the read predetermined detail information.

16. The method of claim 15, wherein the operation of storing the transparent and opaque geometric information comprises storing the transparent geometric information in a one-dimensional array according to decreasing distance between a camera viewing the transparent geometric information and the transparent geometric information.

17. The method of claim 15, wherein the operation of storing the transparent and opaque geometric information comprises storing the texture information included in the opaque geometric information in a texture ring, and storing the opaque geometric information in a sub-geometric ring.

18. The method of claim 12, wherein the operation of interpreting the objects of the scene graph to convert the 3D graphics data into a 2D graphics data comprises:
interpreting the predetermined detail information and transparent and opaque geometric information that correspond to the predetermined detail information; and
converting the predetermined detail information and the transparent and opaque geometric information into the 2D graphics data.

19. The method of claim 18, wherein the operation of interpreting the objects of the scene graph to convert the 3D graphics data into a 2D graphics data comprises:
interpreting the opaque geometric information and converting the opaque geometric information into the 2D graphics data first; and
interpreting the transparent geometric information and converting the transparent geometric information into the 2D graphics data second.

20. The method of claim 19, wherein the operation of converting the predetermined detail information and the transparent and opaque geometric information into the 2D graphics data comprises: converting the 3D graphics data into the 2D graphics data according to decreasing distance between a camera viewing the transparent geometric information and the transparent geometric information.

21. An apparatus for reconstructing three-dimensional (3D) graphics data comprising:
a transparent geometric storage unit;
an opaque geometric storage unit; and a processing unit to output at least one node to either the transparent geometric storage unit or the opaque geometric storage unit depending on detailed information comprised by the at least one node.

22. The apparatus of claim 21, wherein the processing unit outputs the at least one node to the opaque geometric storage unit if the detailed information relates to an opaque object, or to the transparent geometric storage unit if the detailed information relates to a transparent object.

23. The apparatus of claim 21, wherein the transparent geometric storage unit comprises a one-dimensional array storage structure to store the at least one node.

24. The apparatus of claim 23, wherein a plurality of nodes are stored in the one-dimensional array storage in an order determined based on a distance between each node and a camera.

25. The apparatus of claim 24, wherein nodes furthest from the camera are stored first.

26. The apparatus of claim 21, wherein the opaque storage unit comprises a ring structure to store texture information included with the detailed information.

27. The apparatus of claim 26, wherein the opaque storage unit stores like texture information as a single entry on the ring structure.

28. The apparatus of claim 27, wherein the opaque storage unit stores geometric information in sub-rings of the texture information entries on the ring structure.

29. An apparatus for reconstructing three-dimensional (3D) graphics in a scene graph having nodes storing geometric information about an object and material information that corresponds to the geometric information included in the 3D graphics data and hierarchy information regarding the nodes, the apparatus comprising:

a parsing unit to parse 3D graphics data;

an aligning unit to classify objects of the scene graph according to a type of predetermined detail information included in the material information of the nodes and to store the classified objects in an order determined by comparing the predetermined detail information included in the material information of the nodes; and a rendering unit to interpret the objects of the scene graph in the order determined by the aligning unit to convert the 3D graphics data into a two-dimensional (2D) image comprising 2D graphics data.

* * * * *

UNITED STATES PATENT AND TRADEMARK OFFICE
CERTIFICATE OF CORRECTION

PATENT NO. : 7,593,009 B2  
APPLICATION NO. : 11/108818  
DATED : September 22, 2009  
INVENTOR(S) : Sangoak Woo et al.

It is certified that error appears in the above-identified patent and that said Letters Patent is hereby corrected as shown below:

Title Page; item (56);  
First Page, Column 2 (Other Publications), Line 5, change "International Society of Optical" to --International Society for Optical--.

Signed and Sealed this

Twenty-ninth Day of December, 2009

David J. Kappos  
*Director of the United States Patent and Trademark Office*